Aug. 15, 1972    M. A. MARCHESE ET AL    3,684,484
METHOD FOR PRODUCTION OF METAL ALLOY PARTICLES
Filed June 30, 1970    2 Sheets-Sheet 1

INVENTORS
MICHAEL A. MARCHESE
LYNN R. MORGAN

BY

AGENT

Aug. 15, 1972   M. A. MARCHESE ET AL   3,684,484
METHOD FOR PRODUCTION OF METAL ALLOY PARTICLES
Filed June 30, 1970                    2 Sheets-Sheet 2

United States Patent Office

3,684,484
Patented Aug. 15, 1972

3,684,484
METHOD FOR PRODUCTION OF METAL ALLOY PARTICLES
Michael A. Marchese, Boulder, and Lynn R. Morgan, Erie, Colo., assignors to International Business Machines Corporation, Armonk, N.Y.
Filed June 30, 1970, Ser. No. 51,288
Int. Cl. C22b 23/04
U.S. Cl. 75—.5 A                    9 Claims

ABSTRACT OF THE DISCLOSURE

A method and apparatus wherein a plurality of reactant fluids are introduced into a reaction zone through input means which provide for laminar flow of the reactants into the reaction zone while mixing and substantially maintaining the laminar flows of the reaction components and while providing the desired reaction to form uniform fine metallic particles by chemical-oxidation-reduction.

BACKGROUND OF THE INVENTION

Field of the invention

This invention relates to an apparatus and method for the manufacture of metal and metal alloy particles and more specifically to the apparatus and method for the manufacture of ferromagnetic metallic particles for use, for example, in magnetic recording media, permanent magnets, magnetic cores, and in magnetically responsive fluid suspensions.

Description of the prior art

Electroless plating is a well-known process in the prior art and is described in pioneer U.S. Pats. 2,532,283 and 2,532,284. Particles have been made by decomposition of electroless coating baths under certain conditions. The chemical reduction of metal cations in solution onto a catalytic substrate is used in the electroless coating process. The same chemical reduction reaction of metal cations may also be performed in a manner that produces a precipitate of metal or metal alloys in fine particle form. This is accomplished, for example, by catalyzing the electroless bath into a spontaneous reduction of the metal cations under conditions which produce metallic particles. See, for example, IBM Technical Disclosure Bulletin, vol. 9, No. 3, p. 320, August 1966.

One shortcoming of this procedure for producing particles is that it is primarily adapted only to uneconomical batch operations. There is a tendency in batch operations for the particles to join or grow together and in this way diminish their small size, size uniformity, and for magnetic particles to diminish some of their desirable magnetic characteristics.

It is therefore an object of this invention to continuously reduce metal cations to form uniform metallic particles and control the particle sizes and other physical characteristics of the particles.

It is another object of this invention to continuously and uniformly control inputs of reactant materials into a reaction apparatus for continuously and controllably reacting these reactants to yield a uniform small metallic particle precipitate.

It is still a further object of this invention to mix fluid reactants in a laminar flow within a reaction zone to form uniform metallic particles by chemical-oxidation-reduction.

Other objects will become apparent to one skilled in the art from the detailed explanation to follow.

SUMMARY OF THE INVENTION

The above objects and other objects are accomplished by combining the reactant fluid in a reaction apparatus under controlled mixing conditions. In one embodiment of this invention, the reactant fluids are introduced into the reaction chamber or reaction apparatus by means of input rings. These input rings impart a circular flow to the reactant fluids and then release them into flowing contact in a helical downward laminar flow along the inner wall surface of a vertical or inclined hollow tube such that as each reactant fluid moves downward it mixes with the successive flows of other reactant materials to provide controlled mixing and reaction in a laminar flow along the walls of the reaction apparatus. As noted, the flow of each input reactant and the reaction mixture is a circular downward laminar flow or a flow which may properly be characterized as a laminar helical flow.

The helical laminar flow of reactants is provided by introducing each reactant fluid under pressure into an annular space in an input ring, in an angular or tangential flow while allowing the fluid to escape down a shoulder or through a passage to the cylindrical internal surface of the reaction apparatus. The angular momentum of the escaping fluid continues after the fluid has been vented into the reaction apparatus causing circular motion to be imparted to the fluid as it moves down the passage of the reaction apparatus.

Other means of implementing this invention are also detailed.

The foregoing and other objects, features and advantages of the invention will be apparent from the following more particular description of a preferred embodiment of the invention as illustrated in the accompanying drawings.

OPERATION OF THE INVENTION

Figure 1:
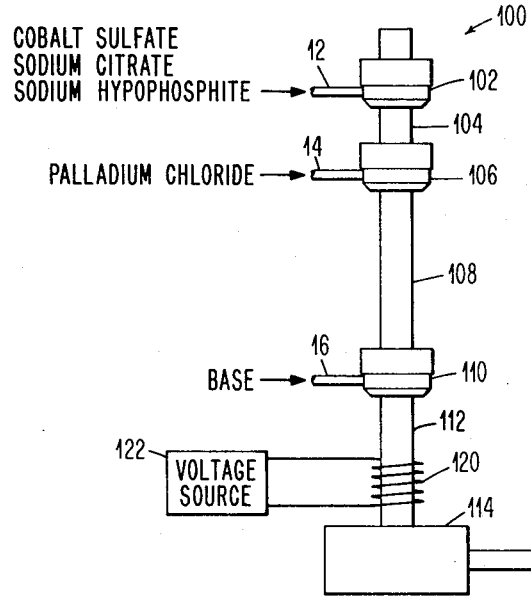
FIG. 1 illustrates a schematic continuous particle producing system including the reaction apparatus.

To secure uniform sized particles of metals or metal alloys by electroless reduction, a processing system is provided as illustrated in FIG. 1. The processing system comprises a plurality of input lines connected to the reaction apparatus. The inputs may be connected to the holding tanks or accumulators (not shown) for the fluid reactants. The particular reactants and the number of tanks and accumulators will depend upon the metal or metal alloy particles desired to be prouced by the reaction and also upon engineering choice.

For the sake of illustration, the solution shown flowing into the reaction apparatus 100 through line 12 is a mixture of cobalt sulfate, sodium citrate, and sodium hypophosphite. Cobalt sulfate provides reducible cobalt cation, while citrate is a cobalt cation complexing agent and hypophosphite anion serves as a reducing agent for the cobalt cations. These two compounds are mixed prior to their insertion into line 12. The temperature of the combinel reactant solutions is controlled prior to their insertion into the reaction apparatus.

A catalyst, such as palladium chloride, flows into the reaction chamber under controlled temperature conditions through line 14.

From line 12 the combined cobalt sulfate, sodium citrate, and sodium hypophosphite fluid is then passed into the first of a plurality of input rings 102.

Figure 2:
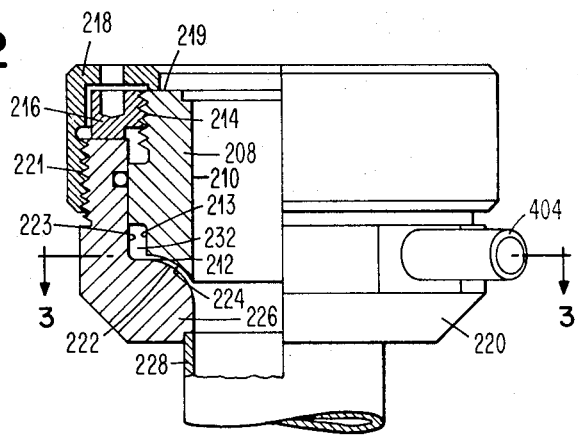
FIG. 2 illustrates the input ring construction in a partial sectional view.
Figure 3:
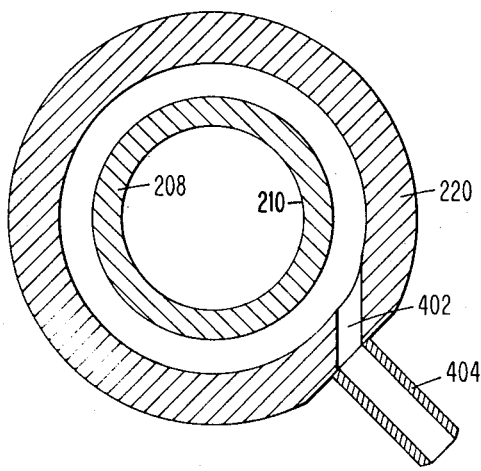
FIG. 3 shows the arrangement of the input channel in the reaction ring taken along line 3—3 of FIG. 2.

The palladium chloride is passed into a second input ring 106. Input rings 102 anl 106 are interconnected by tubular member 104 constructed of a non-reactive material. The cobalt sulfate, sodium citrate, sodium hypophosphite solution flows from input ring 102 down first tubular segment 104 and along the upper portion of second input ring 106, into which is flowing the palladium chloride catalyst. Each of the input rings 102, 106, 110, as illustrated in more detail, FIGS. 2 and 3 are constructed in such a manner as to provide a laminar flow of the reactant fluid introduced through that input ring and provide a laminar flow path for the reactants introduced by any preceding input rings. For example, input ring 102 inserts the cobalt sulfate, sodium citrate, sodium hypophosphite solution into the reaction apparatus 100 in a laminar flow through the first tubular segment 104. As will be explained further, this laminar flow also has downward circular vector resulting in an approximately helical flow around the internal cylindrical surface of the first tubular segment 104. The inner cylindrical surface of input ring 106 receives the last-mentioned solution and also inserts into the reaction apparatus 100 the palladium chloride solution in a circular laminar downward flow along a second tubular segment 108. The effect of the first laminar flow and second laminar flow joining, is a controlled mixing in the region at the top of tubular member 108.

This mixed solution is then received by input ring 110. Input ring 110 receives from line 16 a base, such as ammonium hydroxide. This base is introduced into the reaction apparatus 100 to control the pH of the reactant solutions as the cobalt reduction reaction will not occur in reaction chamber 100 if the reactants are neutral or acid. The base is also introduced in a circular downward laminar flow resulting in a helical laminar flow which intermixes with the flow mixture received by the inner surface of input ring 110, the combined mixture then flowing into tubular member 112. It is at this point, after the reaction mixture is rendered basic, that small uniform metallic cobalt particles are formed by chemical reduction. The chemical reaction is well known in the prior art. In the environment of the present invention, the reaction forms small particles by reduction of metal cations and does not form a continuous film or attach itself to the tubular wall segments.

As the flow of all combined fluid reactants progresses downward through tube 112 of reaction apparatus 100, the reaction proceeds and the reaction products are then received by a container 114. Container 114 may serve the purpose of quenching or ending the reaction or may allow it to continue. From receptacle 114 the reaction products then may be passed to a separator 116, and the metallic particles removed by the separator 116 transmitted to, for example, a rotary dryer 118 to remove the remaining fluid from the particles. The particles may be used wet for some applications.

If the particles are magnetic in nature, such as the magnetic cobalt produced in this example, they may be combined with binders and used in the formation of magnetic record media. If the particles are of a non-magnetic nature, then they are ready for use where fine uniformly-sized particles of metal or metal alloys are required, for example, as fillers, pigments, and catalysts.

Another important factor in the formation of uniform particles in the micron and submicron size range, is the control of the mixing of the reactive fluid components and the length of time they are allowed to react. If non-uniform mixing occurs, the particle sizes will vary considerably, and, if the reaction is allowed to progress for a long time, then the particles can grow to a size which may be too large or non-uniform for the desired uses. Therefore, the continuous operation and the control of the flow of the reactant components controls the mixing of the reactants by laminar flow while the length and inclination of the tube member controls the time that the reaction is allowed to progress, thereby in this additional way controlling particle size and particle size uniformity.

In one application of this invention, a magnetic field is induced in the region of tube member 112. The use of such a field in the formation of the metallic particles is accomplished, for example, by the use of a solenoid coil 120 surrounding tube segment 112 in which the particles are formed. Coil 120 is connected by conductors to a voltage source (alternating or direct current) 122. Alternatively, electromagents or permanent magnets may be used, if desired, to provide a magnetic field.

The input rings disclosed herein are a key element in providing a laminar helical flow on the walls of the reaction apparatus and in securing adequate uniform mixing of the reactive components so that the desired length of time, resulting in particles of uniform size.

To provide a more detailed understanding of the manner of introducing the reactant fluids into the reaction apparatus in a manner such that they will be subject to laminar flow, FIGS. 2 and 3 are provided showing the details of an input ring. All input rings 102, 106, and 110 are identical in construction and FIGS. 2 and 3 are only illustrative of one preferred embodiment of the input rings.

Each input ring has an inside cylindrical surface with a diameter substantially equal to that of the tubular segments interconnecting the input rings. This provides for an undisturbed flow along the tubular segments, and the next adjacent input ring and finally into the mixing zone.

The input ring is generally comprised of two primary elements, a male element 208 and a female element 220. The inner surface 210 of element 208 receives the flow of any preceding solutions from the tubular segment immediately preceeding it. Element 208 has a concave shoulder 212 formed at its lower extremity and flaring outwardly from its central axis to annular surface 213.

The female portion 220 has a hollow cylindrical interior surface 226 and a lower flange 228 which will mate with the tubular segment succeeding it. Extending outwardly and upwardly from the cylindrical interior surface 226 to an annular surface 223, is a convex shoulder 222. This convex shoulder 222 is complementary to the concave portion 212 of segment 208.

Element 208 of the input ring is provided with a threaded region 214. This allows the threading of adjustment ring 216 onto element 208. As can be readily understood by one skilled in the art, adjustment ring 216 may be threaded or adjusted onto portion 208 of the ring to any degree desired to control the size of passage 224 and thereby the volume of fluid passed and the back pressure developed. Proper adjustment of this passage is required in order to obtain the necessary helical laminar flow of the fluid.

Element 220 receives the element 208 of the input ring in mating engagement. A locking collar 218 is threaded down onto the threaded portion 221 of segment 220. The locking collar 218 encounters a shoulder 219 on segment 208 of the input ring. The relative actions of the screw threads of the locking collar 218 and the threaded portion 221 tends to pull the upper edge of segment 220 into abutting engagement with adjusting ring 216.

The position of adjusting ring 216 with respect to the segment 208 therefore controls the dimensions of flared passage 224 which is formed between concave section 212 and the convex section 222 of the elements. Passage 224 communicates with the annular space 232 which is formed by the respective shapes of elements 208 and 220, and annular surfaces 213 and 223.

Referring to FIG. 3, a top sectional view of the input ring, input channel 402 communicates with a connection fitting 404 on element 220 and the annular chamber 232, FIG. 2. The angle of orientation on entry from channel 402 to the annular chamber 232 is approximately tangential so that any fluid introduced through the input channel 402 into annular chamber 232 under pressure will obtain a rotary or circular motion. As the fluid rotates within annular chamber 232 around the central axis of the input ring, it flow through passage 224, FIG. 2, downwardly toward the cylindrical surface 226 of segment 220 of the input ring. The circular vector imparted by the angular entry of the fluid into chamber 232 continues when it passes through passage 224, and when the fluid flows over cylindrical surface 226, it will have a downward and circular vector which will be effectively a helical flow.

By adjusting the adjustment ring 216 and controlling the dimension of passage 224, the volume of flow may be controlled and will provide a laminar flow exiting from passage 224 onto cylindrical surface 226. Any flow of reactant received from cylindrical surface 210 of segment 208 will begin to mix at the point where cylindrical surface 210 and passage 224 meet just above the cylindrical surface 226.

Each of the several input rings are substantially identical. The topmost ring may have a means of exiting reaction gases at its top, rather than means for attaching it to a tubular member, or it may be closed.

One skilled in the art will recognize that flow passage 224 could be of a shape other than that of a flaring curved surface. For example, conical or planar passages could serve the purpose so long as they provide the necessary laminar flow of reactants. In a similar manner, a single input ring could be modified to deliver the flow of more than one reactant to the reaction apparatus. This latter modification could be obtained either by providing a single ring with a plurality of separately fed passages or by utilizing a single passage with a plurality of spaced inputs as well as a plurality of outlets into the reaction chamber. In any event, the steepness of the slope of the helical reactant flows is not critical to this invention. All that is necessary is that sufficient flow, either helically downward or directly downward with sufficient motion or spread to assure that the required controlled laminar mixing of the reactants is obtained.

Figure 4:
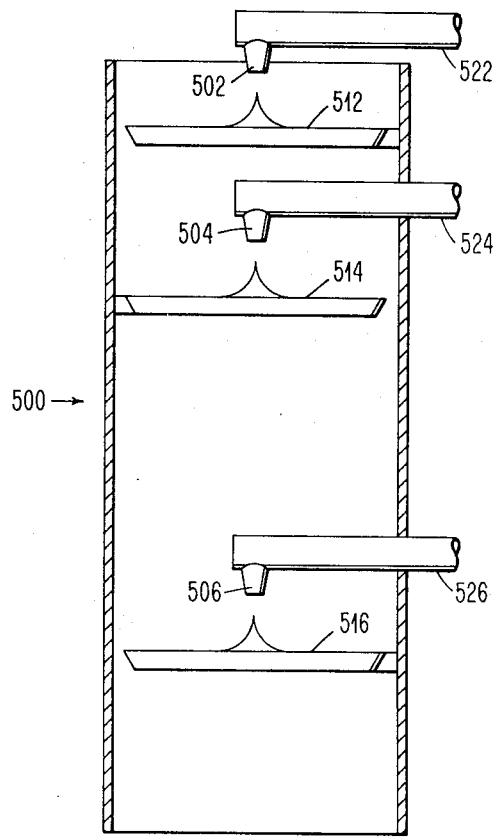
FIGS. 4 and 5 schematically illustrate alternative embodiments of the reaction apparatus.

It will further be appreciated by one skilled in the art that although a single exemplary reaction utilizing the apparatus and method of the present invention has been illustrated modifiaction of the reactants, the mixing order of reactants, and the specific apparatus utilized in practicing this invention is within the scope of the invention. For example, referring to FIG. 4, an alternative embodiment of the apparatus of the present invention is illustrated diagrammatically. In this version of the apparatus, a series of reactant input nozzles, 502, 504, and 506 are centrally located within tubular reaction apparatus 500. Each of the nozzles is directed in a relatively downward direction, toward circular sloped deflecting trays 512, 514, and 516, respectively. The deflecting trays are supported out of contact with the inner surface of the reaction apparatus, but with their circumferential outer edges near the inner tubular surface of the reaction apparatus. In operation, reactant fluids are fed to nozzles 502, 504, and 506 under pressure through pipes 552, 524, and 526, respectively. Upon exiting from the nozzles, each reactant makes dispersing contact with the high central portion of a deflecting tray and is effectively dispersed in a laminar stream 360° wide along the upper surface of the deflecting tray, and finally flows past the edges of the tray into laminar downward flow along the entire inner wall surface of reaction vessel 500 so that controlled laminar mixing of the reactants is obtained. Other forms of internal input means to provide laminar flow are also within the purview of this invention.

Figure 5:
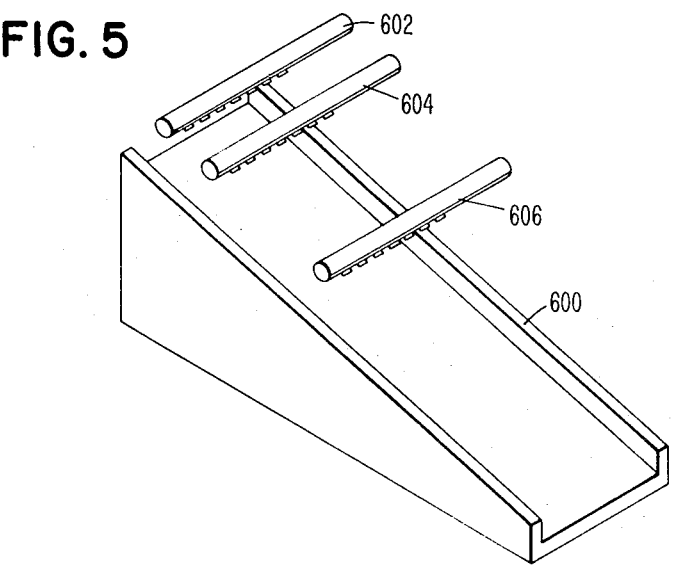

In another alternative embodiment of this invention, as illustrated diagrammatically at FIG. 5, the reaction vessel is in the form of a tilted trough 600. A series of spray bars 602, 604, and 606 are positioned to provide a low angle laminar flow of reactants onto the slanted upper surface of the trough, thereby providing controlled mixing and reaction of the reactants.

Other metal cations, mixtures of cations, and reducing agents, as well as complexing agents, catalysts and pH controlling reactants, as needed, are useful in providing other metallic particles by chemical reduction and are known in the art. These reactants can readily be substituted for those set forth in the example, to thereby produce a large variety of fine uniform metal and alloy particles. Furthermore, the order of insertion of reactants into the reaction apparatus, and the extent of pre-mixing of reactants, short of actual reaction initiation, can be modified to meet the needs of the user. Even the introduction of solid reactants, such as catalyst salt, and gases, such as ammonia, for example, are contemplated within the scope of this invention. All that is required is that the invention be practiced with the controlled, non-turbulent, laminar flow of the major constituents, so that good mixing is obtained along with the resultant fine uniform metallic particles produced by chemical reduction.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of bringing a plurality of chemical reactant fluids together to produce finely divided uniform metallic particles by chemical-oxidation-reduction under controlled mixing conditions in mixing and reaction zones which comprises the steps of:

causing the individual reactant fluids to enter the mixing zone in a controlled laminar flow;

merging the individual reactant fluids within said mixing zone while maintaining substantial laminar flow; and reacting the reactants while in laminar flow in said reaction zone, whereby finely divided metallic particles are produced by chemical-oxidation-reduction.

2. The method of claim 1 wherein the reactant fluids include reducible metal compounds and reducing agents.

3. The method of claim 2 wherein the reducible metal compounds include a compound selected from the group consisting of compounds of iron, cobalt, and nickel, and the finely divided metallic particles produced are magnetic.

4. The method of claim 2 wherein the reducing agents include hypophosphite anion.

5. The method of claim 2 wherein the reactant fluids include a catalyst for the reduction reaction.

6. The method of claim 5 wherein the reactant fluids include a material for pH control.

7. The method of claim 3 wherein the reducible metal compounds include cobalt compounds and the finely divided magnetic particles produced are of cobalt or cobalt alloys.

8. The method of claim 3 wherein a magnetic field is applied at the reaction zone during the reaction step.

9. The method of claim 1 wherein a magnetic field is applied at the reaction zone during the reaction step.

References Cited

UNITED STATES PATENTS

| | | | |
|---|---|---|---|
| 3,045,334 | 7/1962 | Berzins | 75—119 X |
| 3,206,338 | 9/1965 | Miller | 148—105 |
| 3,567,525 | 3/1971 | Graham | 148—31.57 |
| 3,607,218 | 9/1971 | Akashi et al. | 75—.5 AA |

L. DEWAYNE RUTLEDGE, Primary Examiner

J. E. LEGRU, Assistant Examiner

U.S. Cl. X.R.

75—.5 AA